(12) United States Patent
Wang

(10) Patent No.: US 12,108,068 B2
(45) Date of Patent: Oct. 1, 2024

(54) HANDLING DIFFERENT NAL TYPES IN VIDEO SUB-BITSTREAM EXTRACTION

(71) Applicant: Bytedance Inc., Los Angeles, CA (US)

(72) Inventor: Ye-kui Wang, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 18/077,803

(22) Filed: Dec. 8, 2022

(65) Prior Publication Data

US 2023/0104597 A1   Apr. 6, 2023

Related U.S. Application Data

(63) Continuation of application No. PCT/US2021/036471, filed on Jun. 8, 2021.
(Continued)

(51) Int. Cl.
*H04N 19/46* (2014.01)
*H04N 19/105* (2014.01)
*H04N 19/169* (2014.01)

(52) U.S. Cl.
CPC .......... *H04N 19/46* (2014.11); *H04N 19/105* (2014.11); *H04N 19/188* (2014.11)

(58) Field of Classification Search
CPC .... H04N 19/105; H04N 19/188; H04N 19/46; H04N 19/30; H04N 19/37; H04N 19/70
See application file for complete search history.

(56) References Cited

U.S. PATENT DOCUMENTS

| 8,542,492 B2 | 9/2013 | Dunn, Jr. |
| 8,594,202 B2 | 11/2013 | Eleftheriadis |

(Continued)

FOREIGN PATENT DOCUMENTS

| EP | 3123724 B1 | 2/2020 |
| JP | 2017510100 A | 4/2017 |

(Continued)

OTHER PUBLICATIONS

Foreign Communication From a Related Counterpart Communication, Indian Application No. 202247071766 dated Jun. 2, 2023, 5 pages.

(Continued)

*Primary Examiner* — Anner N Holder
(74) *Attorney, Agent, or Firm* — Conley Rose, P.C.

(57) ABSTRACT

Examples of video encoding methods and apparatus and video decoding methods and apparatus are described. An example method of video processing includes performing a conversion between a video and a bitstream of the video, wherein the bitstream includes network abstraction layer (NAL) units for multiple video layers according to a rule; wherein the rule defines a sub-bitstream extraction process by which NAL units are removed from the bitstream to generate an output bitstream, and wherein the rule specifies to remove all supplemental enhancement information (SEI) NAL units that contain a non-scalable-nested SEI message with a particular payload type, responsive to a list of NAL unit header layer identifier values in an output layer set (OLS) with a target OLS index not including all values of NAL unit header layer identifiers in all video coding layer (VCL) NAL units in the bitstream that is input to the sub-bitstream extraction process.

20 Claims, 9 Drawing Sheets

700

Performing a conversion between a video and a bitstream of the video, wherein the bitstream includes network abstraction layer (NAL) units for multiple video layers according to a rule; wherein the rule defines a sub-bitstream extraction process by which NAL units are removed from the bitstream to generate an output bitstream, and wherein the rule specifies to remove all supplemental enhancement information (SEI) NAL units that contain a non-scalable-nested SEI message with a particular payload type, responsive to a list of NAL unit header layer identifier values in an output layer set (OLS) with a target OLS index not including all values of NAL unit header layer identifiers in all video coding layer (VCL) NAL units in the bitstream that is input to the sub-bitstream extraction process. — 702

Related U.S. Application Data

(60) Provisional application No. 63/036,865, filed on Jun. 9, 2020.

(56) References Cited

U.S. PATENT DOCUMENTS

| | | |
|---|---|---|
| 9,154,785 B2 | 10/2015 | Wang |
| 9,270,989 B2 | 2/2016 | Hannuksela |
| 9,521,393 B2 | 12/2016 | Wang et al. |
| 9,584,804 B2 | 2/2017 | Wang |
| 9,712,833 B2 | 7/2017 | Wang |
| 9,894,370 B2 | 2/2018 | Wang |
| 10,205,965 B2 | 2/2019 | Hannuksela |
| 10,432,951 B2 | 10/2019 | Wang |
| 11,356,681 B2 | 6/2022 | Choi |
| 2002/0136298 A1 | 9/2002 | Anantharamu et al. |
| 2010/0232508 A1 | 9/2010 | Kang et al. |
| 2013/0191550 A1 | 7/2013 | Hannuksela |
| 2014/0003489 A1* | 1/2014 | Hannuksela ......... H04N 19/187 375/240.02 |
| 2014/0086341 A1 | 3/2014 | Wang |
| 2014/0098894 A1 | 4/2014 | Wang |
| 2014/0098895 A1 | 4/2014 | Wang |
| 2014/0192149 A1 | 7/2014 | Wang et al. |
| 2014/0301476 A1 | 10/2014 | Deshpande |
| 2015/0103921 A1 | 4/2015 | Hannuksela |
| 2015/0103927 A1 | 4/2015 | Hannuksela |
| 2015/0131744 A1 | 5/2015 | Samuelsson et al. |
| 2015/0172679 A1 | 6/2015 | Choi et al. |
| 2015/0189322 A1 | 7/2015 | He et al. |
| 2015/0271498 A1 | 9/2015 | Wang et al. |
| 2015/0271528 A1 | 9/2015 | Wang et al. |
| 2015/0358640 A1 | 12/2015 | Hendry |
| 2015/0373346 A1 | 12/2015 | Wang |
| 2016/0309159 A1 | 10/2016 | Deshpande |
| 2017/0214923 A1 | 7/2017 | He et al. |
| 2018/0255296 A1 | 9/2018 | Wang |
| 2019/0174144 A1 | 6/2019 | Hannuksela |
| 2022/0217375 A1 | 7/2022 | Wang |
| 2022/0217387 A1 | 7/2022 | Wang |
| 2022/0217391 A1 | 7/2022 | Wang |
| 2022/0217411 A1 | 7/2022 | Wang |
| 2022/0217412 A1 | 7/2022 | Wang |
| 2023/0065580 A1* | 3/2023 | Sanchez De La Fuente ............... H04N 19/184 |
| 2023/0079188 A1 | 3/2023 | Wang |
| 2023/0095551 A1 | 3/2023 | Wang |
| 2023/0106638 A1 | 4/2023 | Wang |
| 2023/0232030 A1 | 7/2023 | Wang |

FOREIGN PATENT DOCUMENTS

| | | | |
|---|---|---|---|
| JP | 2017510198 A | | 4/2017 |
| JP | 2017522779 A | | 8/2017 |
| JP | 2017525234 A5 | | 7/2018 |
| JP | 2022537576 A | | 8/2022 |
| WO | 2015056182 A2 | | 4/2015 |
| WO | 2020103931 A1 | | 5/2020 |
| WO | 2020254720 A1 | | 12/2020 |

OTHER PUBLICATIONS

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
"Series H: Audiovisual and Multimedia Systems Infrastructure of audiovisual services—Coding of moving video High efficiency video coding," ITU-T and ISO/IEC, "High efficiency video coding", Rec. ITU-T H.265 | ISO/IEC 23008-2 (in force edition), Nov. 2019, 712 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13- 21, 2017, 50 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
VTM software, Retrieved from the internet: https://vcgit.hhi.fraunhofer.de/jvet/VVCSoftware_VTM.git, Feb. 9, 2023.
Wenger, S., et al. "RTP payload format for H. 264/SVC scalable video coding." Journal of Zhejiang University—Science A 7.5 (2006), Feb. 25, 2006, pp. 657-667.
Schwarz, H., et al., "Overview of the scalable video coding extension of the H. 264/AVC standard." IEEE Transactions on circuits and systems for video technology vol. 17 No. 9, Sep. 2007, 18 pages.
Foreign Communication From A Related Counterpart Communication, PCT Application No. PCT/US2021/033648 dated Aug. 24, 2021, 13 pages.
Foreign Communication From A Related Counterpart Communication, PCT Application No. PCT/US2021/033707 dated Sep. 14, 2021, 16 pages.
Foreign Communication From A Related Counterpart Communication, PCT Application No. PCT/US2021/033712 dated Aug. 16, 2021, 13 pages.
Foreign Communication From A Related Counterpart Communication, PCT Application No. PCT/US2021/033717 dated Aug. 24, 2021, 15 pages.
Foreign Communication From A Related Counterpart Communication, PCT Application No. PCT/US2021/036471 dated Sep. 1, 2021, 28 pages.
Foreign Communication From A Related Counterpart Communication, PCT Application No. PCT/US/2021/036473 dated Sep. 16, 2021, 35 pages.
Foreign Communication From A Related Counterpart Communication, Indian Application No. 202247071766 dated Feb. 3, 2023, 6 pages.
Foreign Communication From A Related Counterpart Application, Indian Application No. 202247071727, Indian Office Action dated Feb. 3, 2023, 6 pages.
Wang, Y., et al., "SVC temporal layer switching points," Joint Video Team (JVT) of ISO/IEC MPEG & ITU-T VCEG (ISO/IEC JTC1/SC29/WG11 and ITU-T SG16 Q.6) 24th Meeting: Geneva, CH, 29 Jun.-Jul. 5, 2007, 6 pages.
Eleftheriadis, A., et al., "Showcase of temporal level nesting flag," Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, Jan. 13-19, 2007, 8 pages.
He, C., et al., "Showcase of temporal level switching point SEI message," Joint Video Team (JVT) of ISO/IEC MPEG & ITU-T VCEG (ISO/IEC JTC1/SC29/WG11 and ITU-T SG16 Q.6) 25th Meeting: Shenzhen, CN, Oct. 21-26, 2007, 3 pages.
Foreign Communication From A Counterpart Application, Indian Application No. 202247067002, Indian Office Action dated Apr. 26, 2023, 5 pages.
Foreign Communication From A Counterpart Application, European Application No. 21808808.6, Extended European Search Report dated Jun. 12, 2023, 8 pages.
Non-Final Office Action dated Apr. 6, 2023, 18 pages, U.S. Appl. No. 18/077,880, filed Dec. 8, 2022.
Document: JVET-R0090-v2, Drugeon, V., "AHG9: On Video Usability Information," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Sjoberg, R., et al., "HEVC High-Level Syntax," "High Efficiency Video Coding (HEVC) : Algorithms and Architectures," Springer, XP055580157, ISBN: 978-3-319-06895-4 pp. 13-48, DOI: 10.1007/978-3-319-06895-4_2, Aug. 23, 2014, total 36 pages. abstract, sections 2 . 1-2.2, with subsections.
Foreign Communication European Application No. 21808542.1, Extended European Search Report dated Sep. 12, 2023, 11 pages.
Non-Final Office Action dated Jul. 6, 2023, 16 pages, U.S. Appl. No. 17/992,181 filed Nov. 22, 2022.

(56) References Cited

OTHER PUBLICATIONS

Notice of Allowance dated Aug. 11, 2023, 28 pages, U.S. Appl. No. 18/077,880, filed Dec. 8, 2022.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 18 pages.

Document: JVET-S0097-v1, Drugeon, V., "Specification for JVET-S0097," Joint Video Experts Team (JVET) of ITU-T SG 16 WP 3 and ISO/IEC JTC 1/SC 29/WG 11 18th Meeting: by teleconference, Apr. 15-24, 2020, 14 pages.

Document: JVET-S0158-v1, Wang, Y.K., et al., "AHG9/AHG8: On the general sub-bitstream extraction process," Joint Video Experts Team (JVET) of ITU-T SG 16 WP 3 and ISO/IEC JTC 1/SC 29/WG 11 19th Meeting: by teleconference, Jun. 22-Jul. 1, 2020, 4 pages.

\* cited by examiner

710 ⟶

712 — Performing a conversion between a video and a bitstream of the video, wherein the bitstream is separable into one or more sub-bitstreams according to a rule that specifies a sub-bitstream extraction process to generate an output bitstream, and wherein the rule specifies whether or how to remove, based on a type of a video coding layer (VCL) network abstraction layer (NAL) unit and a temporal identifier of a video coding layer associated with the VCL NAL unit, all supplemental enhancement information (SEI) network abstraction layer (NAL) units that contain an SEI message that apply to a picture or a subpicture for which the VCL NAL unit is removed during the sub-bitstream extraction process.

FIG. 7B

HANDLING DIFFERENT NAL TYPES IN VIDEO SUB-BITSTREAM EXTRACTION

CROSS-REFERENCE TO RELATED APPLICATIONS

This application is a continuation of International Patent Application No. PCT/US2021/036471 filed on Jun. 8, 2021, which claims the priority to and benefits of U.S. Provisional Patent Application No. 63/036,865, filed on Jun. 9, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform video encoding or decoding.

In one example aspect, a video processing method is disclosed. The method includes performing a conversion between a video and a bitstream of the video, wherein the bitstream includes network abstraction layer (NAL) units for multiple video layers according to a rule; wherein the rule defines a sub-bitstream extraction process by which NAL units are removed from the bitstream to generate an output bitstream, and wherein the rule specifies to remove all supplemental enhancement information (SEI) NAL units that contain a non-scalable-nested SEI message with a particular payload type, responsive to a list of NAL unit header layer identifier values in an output layer set (OLS) with a target OLS index not including all values of NAL unit header layer identifiers in all video coding layer (VCL) NAL units in the bitstream that is input to the sub-bitstream extraction process.

In another example aspect, another video processing method is disclosed. The method includes performing a conversion between a video and a bitstream of the video, wherein the bitstream is separable into one or more sub-bitstreams according to a rule that specifies a sub-bitstream extraction process to generate an output bitstream, and wherein the rule specifies whether or how to remove, based on a type of a video coding layer (VCL) network abstraction layer (NAL) unit and a temporal identifier of a video coding layer associated with the VCL NAL unit, all supplemental enhancement information (SEI) network abstraction layer (NAL) units that contain an SEI message that apply to a picture or a subpicture for which the VCL NAL unit is removed during the sub-bitstream extraction process.

In another example aspect, another video processing method is disclosed. The method includes performing a conversion between a video and a bitstream of the video according to a rule, wherein the bitstream includes network abstraction layer (NAL) units for multiple video layers according to a rule; wherein the rule defines that a sub-bitstream extraction process to generate an output bitstream comprising an output layer set (OLS) includes one or more operations that are selectively performed responsive to the following conditions: (1) a list of NAL unit header layer identifier values in the OLS does not includes all values of NAL unit header layer identifiers in all video coding layer (VCL) NAL units in the bitstream, and (2) the output bitstream containing a supplemental enhancement information (SEI) NAL unit that contains a scalable-nesting SEI message.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 7A and 7B are flowcharts for example methods of video processing based on some implementations of the disclosed technology.

DETAILED DESCRIPTION

Figure 1:
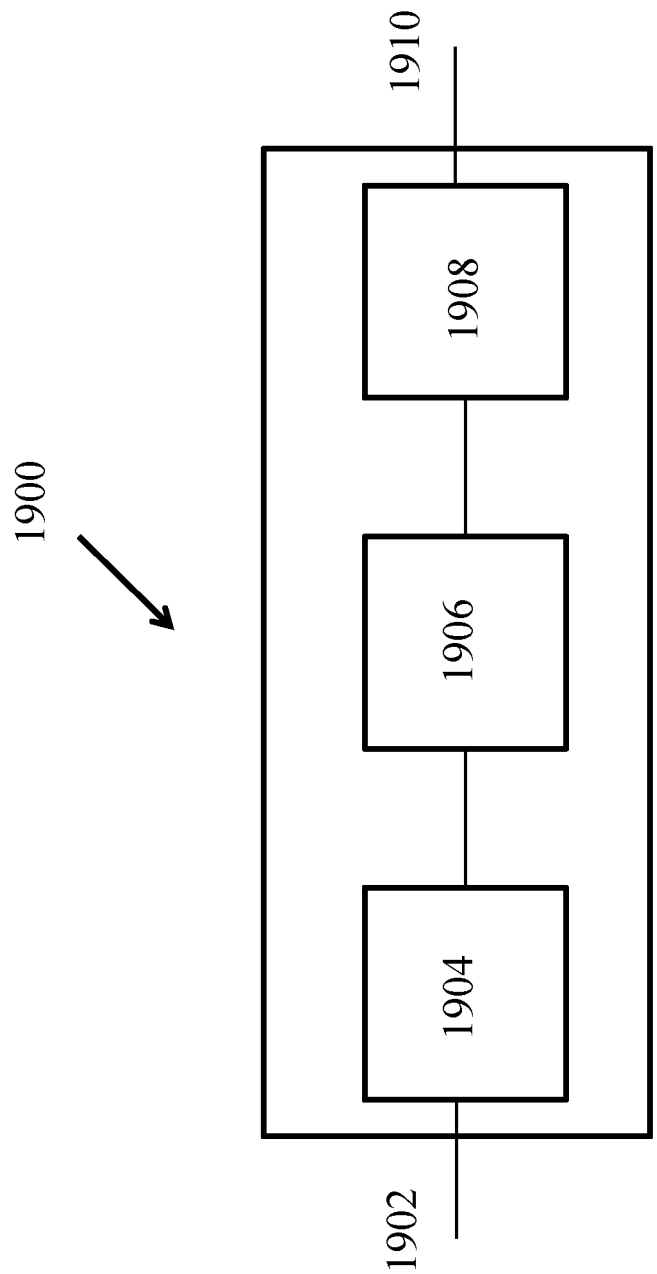
FIG. 1 is a block diagram that illustrates a video coding system in accordance with some implementations of the disclosed technology.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. INTRODUCTION

This document is related to video coding technologies. Specifically, it is about some improvements on the general sub-bitstream extraction process, signalling of picture-level HRD parameters, and containing of SEI messages in SEI NAL units. The ideas may be applied individually or in various combination, to any video coding standard or nonstandard video codec that supports multi-layer video coding, e.g., the being-developed Versatile Video Coding (VVC).

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILP Inter-Layer Prediction
ILRP Inter-Layer Reference Picture
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RAP Random Access Point
RBSP Raw Byte Sequence Payload
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (WET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Resolution Change within a Sequence

In AVC and HEVC, the spatial resolution of pictures cannot change unless a new sequence using a new SPS starts, with an TRAP picture. VVC enables picture resolution change within a sequence at a position without encoding an TRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to 1/2 (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.2. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VPS), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with SD and HD resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. E.g., the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the HLS aspects have been significantly simplified at the sacrifice of some flexibilities. For example, an TRAP AU is required to contain a picture for each of the layers present in the CVS.

3.3. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. General Sub-Bitstream Extraction Process

Clause C.6 of the latest VVC text specifies a general sub-bitstream extraction process, as follows:
C.6 Sub-bitstream extraction process
Inputs to this process are a bitstream inBitstream, a target OLS index targetOlsIdx, and a target highest TemporalId value tIdTarget.
Output of this process is a sub-bitstream outBitstream.
It is a requirement of bitstream conformance for the input bitstream that any output sub-bitstream that satisfies all of the following conditions shall be a conforming bitstream:
   The output sub-bitstream is the output of the process specified in this clause with the bitstream, targetOlsIdx equal to an index to the list of OLSs specified by the VPS, and tIdTarget equal to any value in the range of 0 to 6, inclusive, as inputs.
   The output sub-bitstream contains at least one VCL NAL unit with nuh_layer_id equal to each of the nuh_layer_id values in LayerIdInOls[targetOlsIdx].
   The output sub-bitstream contains at least one VCL NAL unit with TemporalId equal to tIdTarget.
      NOTE—A conforming bitstream contains one or more coded slice NAL units with TemporalId equal to 0, but does not have to contain coded slice NAL units with nuh_layer_id equal to 0.
The output sub-bitstream OutBitstream is derived as follows:
1. The bitstream outBitstream is set to be identical to the bitstream inBitstream.
2. Remove from outBitstream all NAL units with TemporalId greater than tIdTarget. 3. Remove from outBitstream all NAL units with nal_unit_type not equal to any of VPS_NUT, DCI_NUT, and EOB_NUT and with nuh_layer_id not included in the list LayerIdInOls[targetOlsIdx].
4. Remove from outBitstream all VCL NAL units for which all of the following conditions are true, and their associated non-VCL NAL units with nal_unit_type equal to PH_NUT, FD_NUT, SUFFIX_SEI_NUT, and PREFIX_SEI_NUT with PayloadType not equal to 0, 1, or 130:
   nal_unit_type is equal to TRAIL_NUT, STSA_NUT, RADL_NUT, or RASL_NUT, or nal_unit_type is equal to GDR NUT and the associated ph_recovery_poc_cnt is not equal to 0.—
   nuh_layer_id is equal to LayerIdInOls[targetOlsIdx][j] for a value of j in the range of 0 to NumLayersInOls[targetOlsIdx]−1 inclusive.
   TemporalId is greater than or equal to NumSubLayersInLayerInOLS[targetOlsIdx][GeneralLayerIdx[nuh_layer_id]].
5. Remove from outBitstream all SEI NAL units that contain a scalable nesting SEI message that has sn_ols_flag equal to 1 and there is no value of i in the range of 0 to sn_num_olss_minus1, inclusive, such that NestingOlsIdx[i] is equal to targetOlsIdx.
6. When LayerIdInOls[targetOlsIdx] does not include all values of nuh_layer_id in all NAL units in the bitstream, the following applies:
   a. Remove from outBitstream all SEI NAL units that contain a non-scalable-nested SEI message with payloadType equal to 0 (BP) or 130 (DUI).
   b. When general_same_pic_timing_in_all_ols_flag is equal to 0, remove from outBitstream all SEI NAL units that contain a non-scalable-nested SEI message with payloadType equal to 1 (PT).
c. When outBitstream contains SEI NAL units that contain a scalable nesting SEI message with sn_ols_flag equal to 1 and are applicable to outBitstream (NestingOlsIdx[i] is equal to targetOlsIdx), the following applies:
If general_same_pic_timing_in_all_ols_flag is equal to 0, extract appropriate non-scalable-nested SEI message with payloadType equal to 0 (BP), 1 (PT), or 130 (DUI) from the scalable nesting SEI message and include those SEI messages in outBitstream.
Otherwise (general_same_pic_timing_in_all_ols_flag is equal to 1), extract appropriate non-scalable-nested SEI message with payloadType equal to 0 (BP) or 130 (DUI) from the scalable nesting SEI message and include those SEI messages in outBitstream.

4. TECHNICAL PROBLEMS SOLVED BY DISCLOSED TECHNICAL SOLUTIONS

The existing designs of the general sub-bitstream extraction process and related other parts in the latest VVC text (in WET-R2001-vA/v10) have the following problems:
1) In the conditions under which an output sub-bitstream is required to be a conforming bitstream, the value of tIdTarget is said to be in the range of 0 to 6, inclusive. However, in many bitstreams, the highest TemporalId value is less than 6, and that value is specified by the syntax element vps_max_sublayers_minus1.
2) An access unit delimiter (AUD) NAL unit, when present, can have any nuh_layer_id value. However, step 3 of the sub-bitstream extraction process would remove the AUD NAL units for which the nuh_layer_id values are not included in the list LayerIdInOls[targetOlsIdx].
3) Some SEI NAL units contain a scalable nesting SEI message with sn_ols_flag equal to 0 while the applicable layers as indicted in the scalable nesting SEI message does not included any layer in the target OLS, i.e., none of the applicable layers' nuh_layer_id values is not included in the list LayerIdInOls[targetOlsIdx]. These SEI NAL units should also be removed.
4) The condition of step 6, i.e., "When LayerIdInOls [targetOlsIdx] does not include all values of nuh_layer_id in all NAL units in the bitstream" has the following two issues.
a. The condition does not work for cases when DCI, VPS, AUD, or EOB NAL units are present and have nuh_layer_id not equal to any of the nuh_layer_id values of the VCL NAL units.
b. The phrase "the bitstream" is not clear, as there are two bitstreams involved in the context, inBitstream and outBitstream.
5) Step 6.c would extract scalable-nested SEI messages, to generate non-scalable-nested SEI messages, from scalable nesting SEI messages with both sn_ols_flag equal to 1 and sn_subpic_flag equal to 1, while such scalable-nested SEI messages only apple to specific subpictures and thus should not be extracted.
6) In step 6.c, when multiple scalable-nested SEI messages are extracted from one SEI NAL unit seiNalUnitA to be non-scalable-nested SEI messages, they should still be included in one SEI NAL unit seiNalUnitB, and the SEI NAL unit seiNalUnitB should be included in the same PU that contained the SEI NAL unit seiNalUnitA. However, this is not specified.
7) Step 6.c should remove, from outBitstream, all SEI NAL units from which some SEI messages have been extracted and included as non-scalable-nested SEI messages. However, this is not specified.
8) There lacks a constraint such that when an SEI NAL unit contain an SEI message with payloadType equal to 0, 1, or 130, the SEI NAL unit shall not contain an SEI message with payloadType not equal to 0 (BP), 1 (PT), 130 (DUI), or 133 (scalable nesting). This causes the removal of SEI messages in step 4 involves more than just removal of SEI NAL units.
9) The flag general_same_pic_timing_in_all_ols_flag only specifies whether non-scalable-nested PT SEI messages apply to all OLSs. However, information carried in the DUI SEI messages are for similar purposes as in the PT SEI messages.
10) When removing from the output bitstream the VCL NAL units for which both of the following two conditions are true: a) nal_unit_type is equal to TRAIL_NUT, STSA_NUT, RADL_NUT, or RASL_NUT, or nal_unit_type is equal to GDR NUT and the associated ph_recovery_poc_cnt is greater than 0, and b) TemporalId is greater than or equal to NumSubLayersInLayerInOLS[targetOlsIdx][GeneralLayerIdx[nuh_layer_id]], the step also removes the associated SEI NAL units containing SEI messages other than the BP, PT, or DUI SEI messages. However, some of those SEI messages removed may apply to OLSs or layers that contain pictures remaining in the output bitstream.
11) The subpicture level information SEI messages, when present, apply to OLSs, like the other HRD-related SEI messages, i.e., BP, PT, DUI SEI messages. However, when LayerIdInOls[targetOlsIdx] does not include all values of nuh_layer_id in all NAL units in the bitstream, SEI NAL units that contain a non-scalable-nested SEI message with payloadType equal to 203 (i.e., subpicture level information SEI message) are not addressed in the extraction process.
12) The last step that makes scalable-nested SEI messages to be non-scalable-nested SEI messages has the following issues:
a. SEI messages in the case with sn_ols_flag equal to 0 and sn_subpic_flag equal to 0 are not covered.
b. Where the resulting non-scalable-nested SEI messages should be placed (in which SEI NAL unit, where the SEI NAL unit should be) in the output bitstream is unspecified.

5. A LISTING OF TECHNICAL SOLUTIONS AND EMBODIMENTS

To solve the above problems, and others, methods as summarized below are disclosed. The items should be considered as examples to explain the general concepts and should not be interpreted in a narrow way. Furthermore, these items can be applied individually or combined in any manner.
1) To solve problem 1, the conditions under which an output sub-bitstream is required to be a conforming bitstream is specified such that the value of tIdTarget is specified be in the range of 0 to vps_max_sublayers_minus1, inclusive.
a. Alternatively, the conditions under which an output sub-bitstream is required to be a conforming bitstream is specified such that the value of tIdTarget is specified be in the range of 0 to vps_max_sublayers_minus1, inclusive, when there is more than one layer in the input bitstream, and specified be in the range of 0 to sps_max_sublayers_minus1, inclusive, when there is only one layer in the input bitstream.
2) To solve problem 2, the general sub-bitstream extraction process is specified such that AUD NAL units are treated in the same manner as NAL units with nal_unit_type equal to VPS_NUT, DCI_NUT, or EOB_NUT. In other words, no AUD NAL unit is removed from the output bitstream outBitstream according to the nuh_layer_id value.
3) To solve problem 3, the general sub-bitstream extraction process is specified such that it would remove, the output bitstream outBitstream, SEI NAL units that contain a scalable nesting SEI message with sn_ols_flag equal to 0 while the applicable layers as indicted in the scalable nesting SEI message does not included any layer in the target OLS.
   a. In one example, it is specified to remove from outBitstream all SEI NAL units that contain a scalable nesting SEI message that has sn_ols_flag equal to 0 and there is no value in the list nestingLayerId[i] for i in the range of 0 to nestingNumLayers−1, inclusive, that is in the list LayerIdInOls[targetOlsIdx].
4) To solve problem 4, the condition "When LayerIdInOls[targetOlsIdx] does not include all values of nuh_layer_id in all NAL units in the bitstream" is changed to be "When the list LayerIdInOls[targetOlsIdx] does not include all values of nuh_layer_id in all VCL NAL units in the bitstream inBitstream".
5) To solve problem 5, the general sub-bitstream extraction process is specified such that it only extracts scalable-nested SEI messages from scalable nesting SEI messages with both sn_ols_flag equal to 1 and sn_subpic_flag equal to 0 to generate non-scalable-nested SEI messages.
6) To solve problem 6, the general sub-bitstream extraction process is specified such that, when multiple scalable-nested SEI messages are extracted from one SEI NAL unit seiNalUnitA to be non-scalable-nested SEI messages, they are still included in one SEI NAL unit seiNalUnitB in the output bitstream outBitstream, and the SEI NAL unit seiNalUnitB is included in the PU that contained the SEI NAL unit seiNalUnitA.
7) To solve problem 7, the general sub-bitstream extraction process is specified such that it removes, from the output bitstream outBitstream, all SEI NAL units from which some SEI messages have been extracted and included as non-scalable-nested SEI messages.
   a. Alternatively, when the scalable-nested SEI messages in such an SEI NAL unit apply only to the target OLS (i.e., the targetOlsIdx-th OLS specified by the VPS), remove the SEI NAL unit from outBitstream.
   b. Alternatively, when there is no OLS, other than the target OLS in the OLSs to which the scalable-nested SEI messages in such an SEI NAL unit apply, that contains layers that are all included in the list LayerIdInOls[targetOlsIdx], remove the SEI NAL unit from outBitstream.
8) To solve problem 8, add constraint such that when an SEI NAL unit contain an SEI message with payloadType equal to 0, 1, or 130, the SEI NAL unit shall not contain an SEI message with payloadType not equal to 0 (BP), 1 (PT), 130 (DUI), or 133 (scalable nesting).
9) To solve problem 9, the flag general_same_pic_timing_in_all_ols_flag specifies whether non-scalable-nested PT and DUI SEI messages apply to all OLSs.
   a. Alternatively, the flag general_same_pic_timing_in_all_ols_flag specifies whether non-scalable-nested BP, PT, and DUI SEI messages apply to all OLSs.
      i. In one example, the flag general_same_pic_timing_in_all_ols_flag is renamed to be flag general_same_pic_level_hrd_info_in_all_ols_flag, which specifies whether non-scalable-nested BP, PT, and DUI SEI messages apply to all OLSs.
   b. Alternatively, a new flag, e.g., named general_same_dui_in_all_ols_flag, is added, to specify whether non-scalable-nested DUI SEI messages apply to all OLSs.
   c. Alternatively, a new flag, e.g., named general_same_bp_in_all_ols_flag, is added, to specify whether non-scalable-nested BP SEI messages apply to all OLSs.
10) To solve problem 10, in one example, in the general sub-bitstream extraction process, when removing from the output bitstream the VCL NAL units for which both of the following two conditions are true: a) nal_unit_type is equal to TRAIL_NUT, STSA_NUT, RADL_NUT, or RASL_NUT, or nal_unit_type is equal to GDR_NUT and the associated ph_recovery_poc_cnt is greater than 0, and b) TemporalId is greater than or equal to NumSubLayersInLayerInOLS[targetOlsIdx][GeneralLayerIdx[nuh_layer_id]], instead of removing the associated SEI NAL units containing SEI messages other than the BP, PT, or DUI SEI messages, remove all all SEI NAL units that contain SEI messages that only apply to one or more of the pictures or subpictures for which all VCL NAL units are being removed.
    a. In one example, alternatively, keep the associated SEI NAL units in the output bitstream when removing such VCL NAL units.
11) To solve problem 11, in one example, in the general sub-bitstream extraction process, when LayerIdInOls[targetOlsIdx] does not include all values of nuh_layer_id in all NAL units in the bitstream, additionally remove all SEI NAL units that contain a non-scalable-nested SEI message with payloadType equal to 203 (i.e., subpicture level information SEI message).
12) To solve problem 12, in one example, in the general sub-bitstream extraction process, when LayerIdInOls[targetOlsIdx] does not include all values of nuh_layer_id in all NAL units in the bitstream, and the outBitstream contains an SEI NAL unit seiNalUnitA that contains a scalable nesting SEI message with sn_subpic_flag equal to 0 that applies to the OLSs (when sn_ols_flag is equal to 1) or the layers (when sn_ols_flag is equal to 0) that have the same set of layers as in outBitstream, perform one or more of the following:
    a. Generate a new SEI NAL unit seiNalUnitB.
    b. Include seiNalUnitB in the PU containing seiNalUnitA.
    c. Include seiNalUnitB in the PU containing seiNalUnitA immediately after seiNalUnitA.
    d. Extract the scalable-nested SEI messages from the scalable nesting SEI message and include them directly in seiNalUnitB (as non-scalable-nested SEI messages).
    e. Remove seiNalUnitA from outBitstream.
13) In one example, in the general sub-bitstream extraction process, when LayerIdInOls[targetOlsIdx] does not include all values of nuh_layer_id in all NAL units in the bitstream, and the outBitstream contains an SEI NAL unit seiNalUnitA that contains a scalable nesting SEI message, keep seiNalUnitA in the output bitstream.

6. EMBODIMENTS

Below are some example embodiments for some of the invention aspects summarized above in Section 5, which can be applied to the VVC specification. The changed texts are based on the latest VVC text in JVET-R2001-vA/v10. Most relevant parts that have been added or modified are highlighted in bold and Italic, and some of the deleted parts are marked with double brackets (e.g., [[a]] denotes the deletion of the character "a". There may be some other changes that are editorial in nature and thus not highlighted.

6.1. First Embodiment

This embodiment is for items 1, 2, 3, 3.a, 4, 5, 6, 7.b, and 8.

C.6 *General* Sub-Bitstream Extraction Process

Inputs to this process are a bitstream inBitstream, a target OLS index targetOlsIdx, and a target highest TemporalId value tIdTarget.

Output of this process is a sub-bitstream outBitstream.

It is a requirement of bitstream conformance for the input bitstream that any output sub-bitstream that satisfies all of the following conditions shall be a conforming bitstream:—

The output sub-bitstream is the output of the process specified in this clause with the bitstream, targetOlsIdx equal to an index to the list of OLSs specified by the VPS, and tIdTarget equal to any value in the range of 0 to *vps_max_sublayers_minus1*, inclusive, as inputs.

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream OutBitstream is derived *by applying the following ordered steps* :

1. The bitstream outBitstream is set to be identical to the bitstream inBitstream.
2. Remove from outBitstream all NAL units with TemporalId greater than tIdTarget.
3. Remove from outBitstream all NAL units with nal_unit_type not equal to any of DCI_NUT, VPS_NUT, *AUD_NUT,* , and EOB_NUT and with nuh_layer_id not included in the list LayerIdInOls [targetOlsIdx].
4. Remove from outBitstream all VCL NAL units for which all of the following conditions are true, and *also remove from outBitstream*

*these VCL NAK units'* associated non-VCL NAL units *that have* nal_unit_type equal to PH_NUT or FD_NUT, *or have nal_unit_type equal to* SUFFIX_SEI_NUT *or* PREFIX_SEI_NUT *and contain SEI messages nesting)* not equal to 0 (BP), 1 (PT), 130 (DUI), *or or 133 (scalable with payloadType* :
   nal_unit_type is equal to TRAIL_NUT, STSA_NUT, RADL_NUT, or RASL_NUT, or nal_unit_type is equal to GDR_NUT and the associated ph_recovery_poc_cnt is not equal to 0.—

TemporalId is greater than or equal to NumSubLayersInLayerInOLS[targetOlsIdx] [GeneralLayerIdx [nuh_layer_id]].
5. Remove from outBitstream all SEI NAL units that contain a scalable nesting SEI message that has sn_ols_flag equal to 1 and there is no value of i in the range of 0 to snnum_olss_minus1, inclusive, such that NestingOlsIdx[i] is equal to targetOlsIdx.
6. *Remove from outBitstream*

*all SEI NAL units that* contain a scalable nesting SEI message that has sn_ols_flag equal to 0 and there is no value in the *list nestingLayerId[ i ] for i in the range of 0 to nestingNumLayers - 1 inclusive, that is in the list Layer IdInOls[ targetOlsIdx ].*
7. When LayerIdInOls[targetOlsIdx] does not include all values of nuh_layer_id in all VCL NAL units in the bitstream *inBitstream* , the following applies *in the order listed* :

a. Remove from outBitstream all SEI NAL units that contain a non-scalable-nested SEI message with payloadType equal to 0 (BP) or 130 (DUI).

b. When general_same_pic_timing_in_all_ols_flag is equal to 0, remove from outBitstream all SEI NAL units that contain a non-scalable-nested SEI message with payloadType equal to 1 (PT).

c. When outBitstream contains SEI NAL units that contain a scalable nesting SEI message with sn_ols_flag equal to 1 *and sn_subpic_flag equal to 0* that applies to the targetOlsIdx-th OLS (i.e., there is at least one value of i in the range of 0 to sn_num_olss_minus1, inclusive, such that NestingOlsIdx[i] is equal to targetOlsIdx), the following applies *in the order listed* :

i. For each scalable-nested BP or DUI SEI message in such an SEI NAL unit seiNalUnitA, *generate a non-scalable-nested SEI*

*message with the same payloadType and SEI payload and include it in*

*an SEI NAL unit in the PU*

*containing seiNalUnitA* in outBitstream.

ii. When general_same_pic_timing_in_all_ols_flag is equal to 0, for each scalable-nested PT SEI message in such an SEI NAL unit seiNalUnitA, *generate a non-scalable-nested*

*SEI message with the same SEI payload and include it in an SEI NAL*

*unit in the PU containing seiNalUnitA* in outBitstream.

iii. *When multiple SEI messages*

*contained in a particular such SEI NAL unit seiNalUnitA were made*

*non-scalable-nested SEI messages,*

*thuse non-scalable-nested SEI*

*messages are included in one SEI NAL unit.* iv. *When there is no OLS,*

*other than the target OLS*

*in the OLSs to which the scalable-nested SEI messages in such an SEI NAL*

*unit seiNalUnitA apply, that contains layers that are all included*

*in the list LayerIdInOls[ targetOlsIdx ],*

*remove the SEI NAL unit sei
NalUnitA from outBitstream.*.

D.2.2 General SEI Payload Semantics

. . .

It is a requirement of bitstream conformance that the following restrictions apply on containing of SEI messages in SEI NAL units:

When an SEI NAL unit contains a non-scalable-nested BP SEI message, a non-scalable-nested PT SEI message, or a non-scalable-nested DUI SEI message, the SEI NAL unit shall not contain any other SEI message with payloadType not equal to 0 (BP), 1 (PT), or 130 (DUI).

When an SEI NAL unit contains a scalable-nested BP SEI message, a scalable-nested PT SEI message, or a scalable-nested DUI SEI message, the SEI NAL unit shall not contain any other SEI message with payloadType not equal to 0 (BP), 1 (PT), 130 (DUI) or 133 (scalable nesting).

*When an SEI NAL unit contain
an SEI message with payload
Type equal to 0, 1, or 130,* the SEI NAL unit
shall not contain an SEI message
with *payloadType not equal to 0 (BP), 1 (PT),
130 (DUI), or 133 (scalable nesting).*

. . .

6.2. Second Embodiment

This embodiment is for items 10 to 12, inclusive, with changes relative to the embodiment 1 text above marked with highlights.

C.6 General Sub-Bitstream Extraction Process

Inputs to this process are a bitstream inBitstream, a target OLS index targetOlsIdx, and a target highest TemporalId value tIdTarget.

Output of this process is a sub-bitstream outBitstream.

*The OLS with OLS index* targetOlsIdx *is referred
to as the target OLS*.

It is a requirement of bitstream conformance for the input bitstream that any output sub-bitstream that satisfies all of the following conditions shall be a conforming bitstream:

The output sub-bitstream is the output of the process specified in this clause with the bitstream, targetOlsIdx equal to an index to the list of OLSs specified by the VPS, and tIdTarget equal to any value in the range of 0 to vps_max_sublayers_minus1, inclusive, as inputs.

The output sub-bitstream contains at least one VCL NAL unit with nuh_layer_id equal to each of the nuh_layer_id values in LayerIdInOls[targetOlsIdx].

The output sub-bitstream contains at least one VCL NAL unit with TemporalId equal to tIdTarget.

NOTE—A conforming bitstream contains one or more coded slice NAL units with TemporalId equal to 0, but does not have to contain coded slice NAL units with nuh_layer_id equal to 0.

The output sub-bitstream OutBitstream is derived by applying the following ordered steps:

1. The bitstream outBitstream is set to be identical to the bitstream inBitstream.
2. Remove from outBitstream all NAL units with TemporalId greater than tIdTarget.
3. Remove from outBitstream all NAL units *that have* nuh_layer_id not included in the list LayerIdInOls[targetOlsIdx] *and are not AUD NAL units, DCI NAL units, VPS NAL units,, EOB NAL units,,* or SEI NAL units containing non-scalable-nested SEI messages..

4. Remove from outBitstream all VCL NAL units for which all of the following conditions are true, *and their* associated non-VCL NAL units that have nal_unit_type equal to PH_NUT or FD_NUT:

nal_unit_type is equal to TRAIL_NUT, STSA_NUT, RADL_NUT, or RASL_NUT, or nal_unit_type is equal to GDR_NUT and the associated ph_recovery_poc_cnt is *greater than* to 0.

TemporalId is greater than or equal to NumSubLayersInLayerInOLS[targetOlsIdx][GeneralLayerIdx[nuh_layer_id]].

5. *Remove from outBitstream
all SEI NAL units that only
contain SEI messages that
do not apply to the OLSs,,        layers,, pictures,,
subpictures,, or slices in outBitstream,, as follows:*:

Remove from outBitstream all SEI NAL units that contain a scalable nesting SEI message that has sn_ols_flag equal to 1 and there is no value of i in the range of 0 to sn_num_olss_minus1, inclusive, such that NestingOlsIdx[i] is equal to targetOlsIdx.

Remove from outBitstream all SEI NAL units that contain a scalable nesting SEI message that has sn_ols_flag equal to 0 and there is no value in the list nestingLayerId[i] for i in the range of 0 to nestingNumLayers−1, inclusive, that is in the list LayerIdInOls[targetOlsIdx].

*Alternatively, remove from outBitstream
all SEI NAL units that
contain a scalable nesting SEI
message that has sn_ols_flag
a value in the list Layer
IdInOls[ targetOlsIdx ].
equal to 0 and there is no
value in the list Nesting LayerId equal to*

− *Remove from outBitstream
all SEI NAL units that contain
SEI messages that only apply to one or more
of the pictures or subpictures
for which all VCL NAL units have been
removed by step 4.*

6. When LayerIdInOls[targetOlsIdx] does not include all values of nuh_layer_id in all VCL NAL units in the bitstream inBitstream, the following applies in the order listed:

a. Remove from outBitstream all SEI NAL units that contain a non-scalable-nested SEI message with payloadType equal to 0 (BP), *130 (DUI), or 203 (SLI)* .

b. When general_same_pic_timing_in_all_ols_flag is equal to 0, remove from outBitstream all SEI NAL units that contain a non-scalable-nested SEI message with payloadType equal to 1 (PT).

c. *When outBitstream contains
an SEI NAL unit seiNalUnitA that contains a
scalable nesting SEI message with sn_subpic_
flag equal to 0 that applies
to the OLSs (when sn_ols_
flag is equal to 1) or the
layers (when sn_ols_flag is
equal to 0) that have the same set of layers as in
outBitstream, generate a
new SEI NAL unit seiNalUnitB, seiNalUnitA,
include it in the PU containing seiNalUnitA
immediately after extract the scalable-nested
SEI messages from the scalable* nesting SEI message and include them directly in seiNalUnitB (as non-scalable-nested SEI messages), and remove seiNalUnitA from outBitstream.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
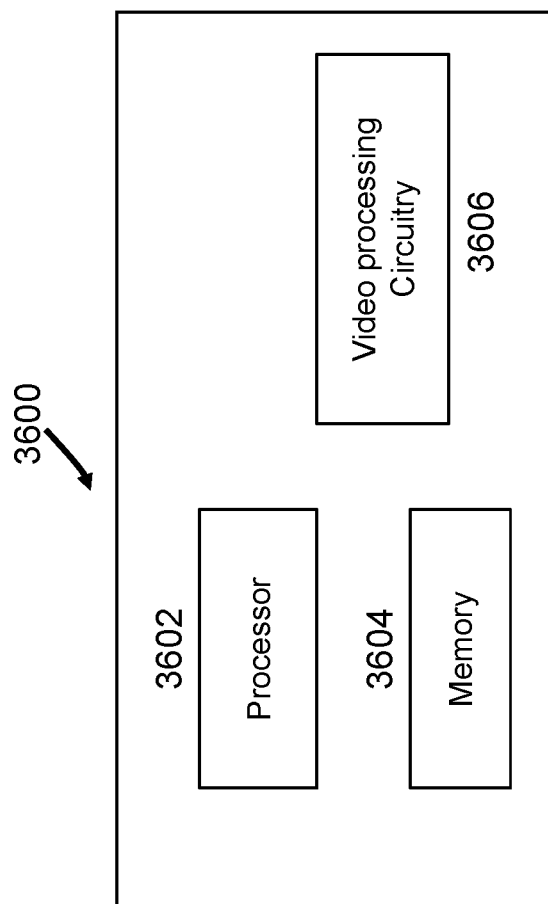
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 4:
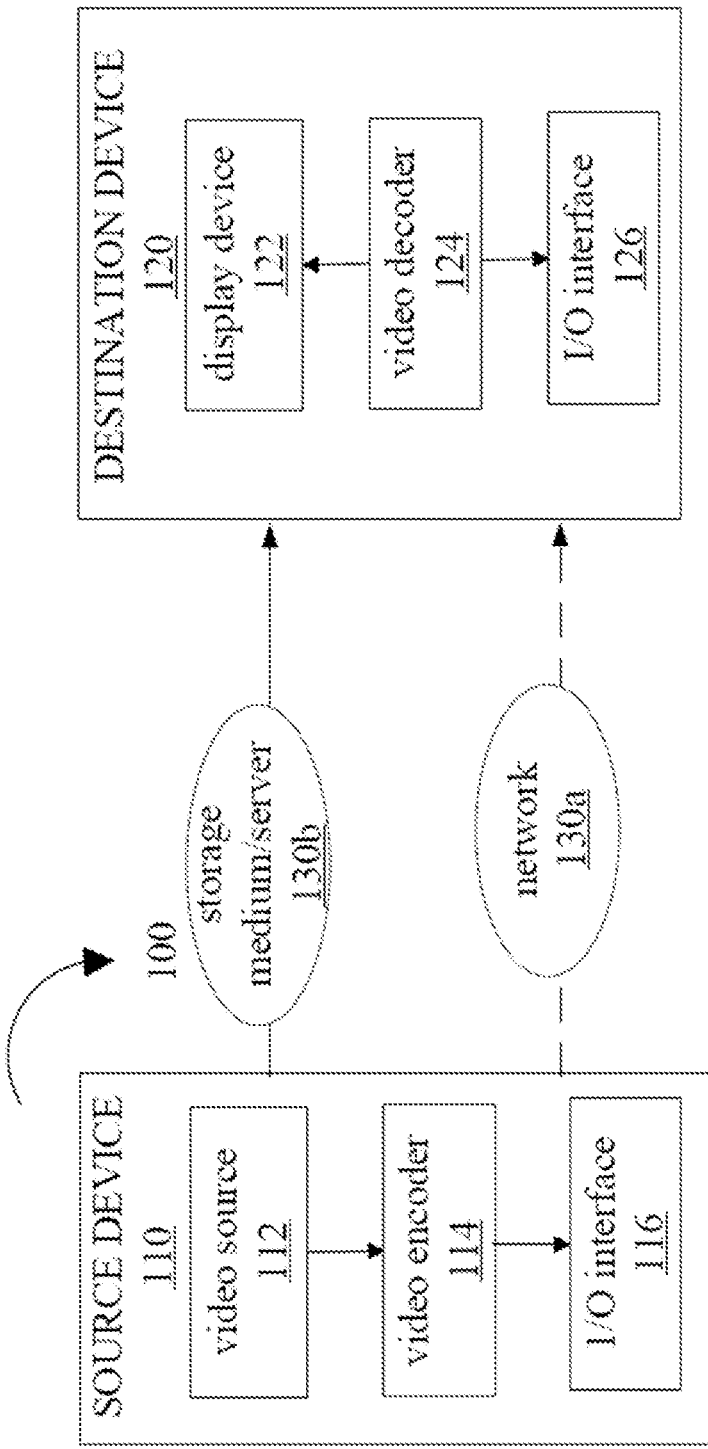
FIG. 4 is a block diagram that illustrates an example video coding system.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
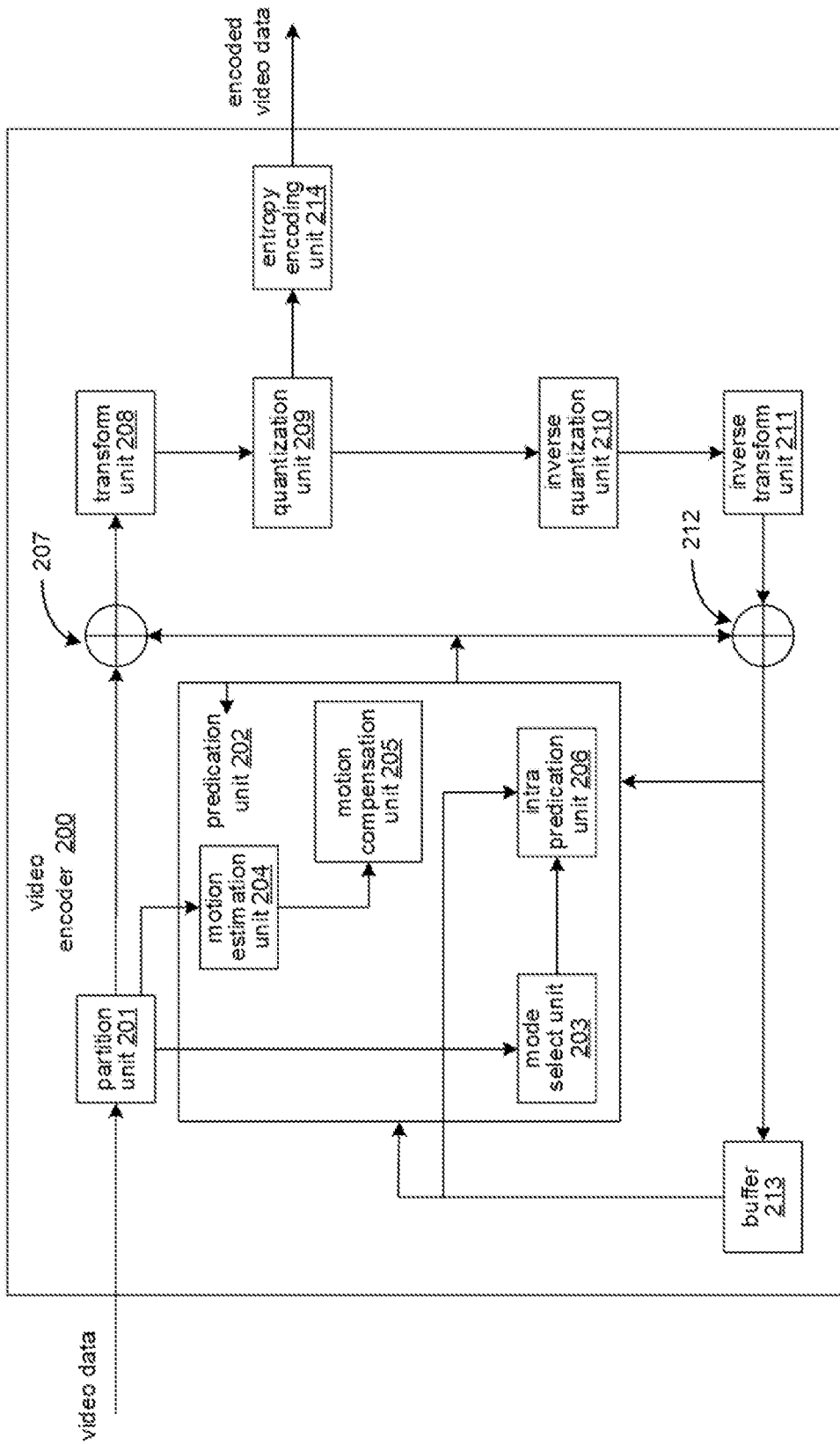
FIG. 5 is a block diagram that illustrates an encoder in accordance with some implementations of the disclosed technology.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
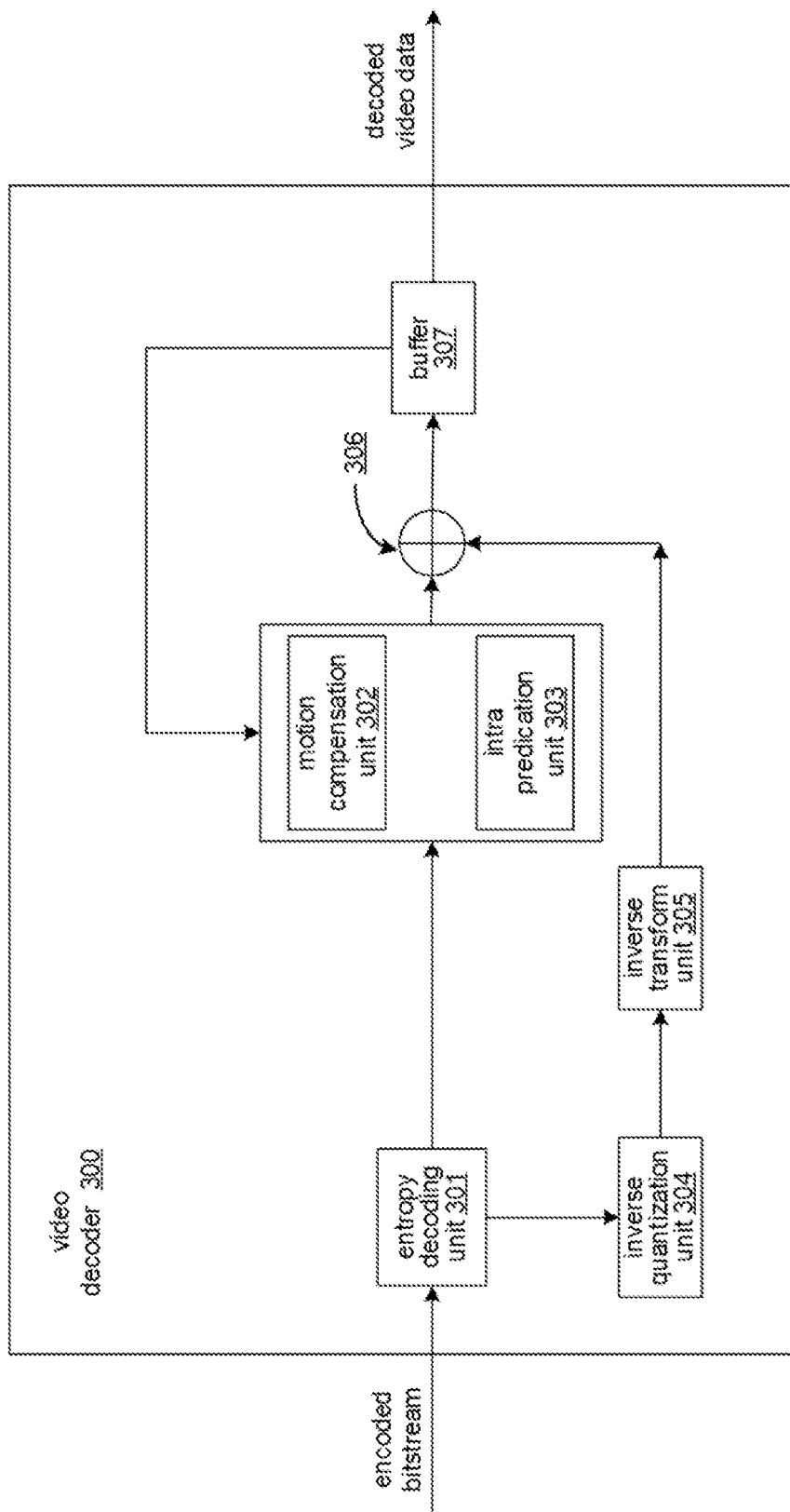
FIG. 6 is a block diagram that illustrates a decoder in accordance with some implementations of the disclosed technology.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided next. The following solutions show example embodiments of techniques discussed in the previous section (e.g., items 1-9).

Figure 3:
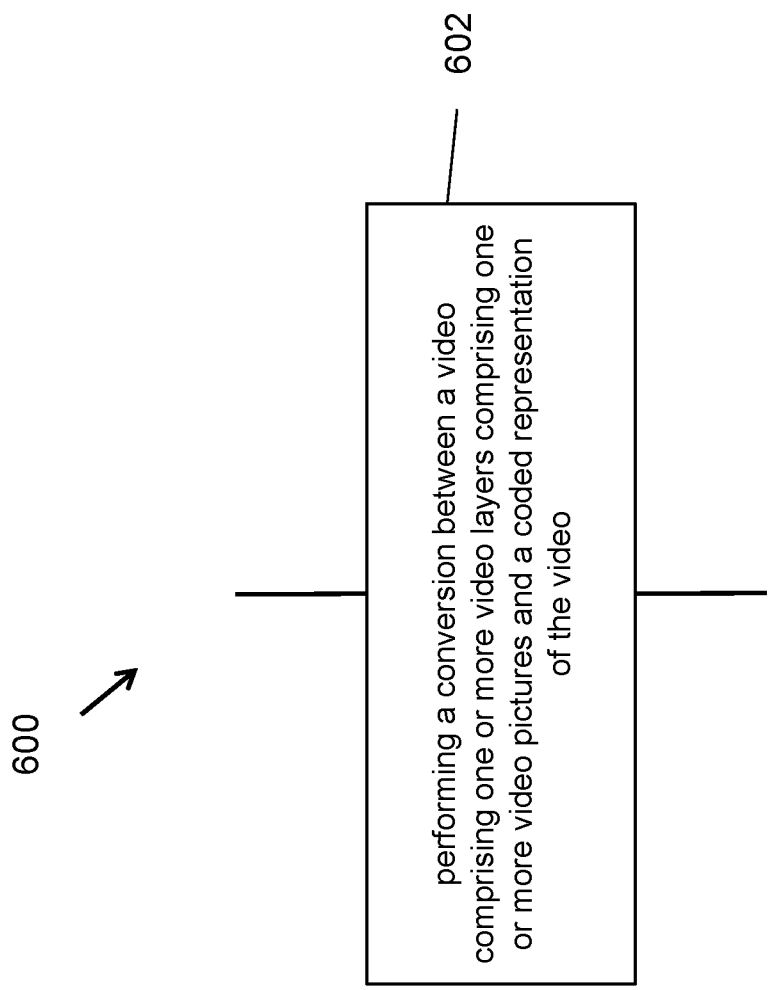
FIG. 3 is a flowchart for an example method of video processing.

1. A method of video processing (e.g., method 600 in FIG. 3), comprising performing (602) a conversion between a video comprising one or more video layers comprising one or more video pictures and a coded representation of the video, wherein the coded representation conforms to a format rule related to extraction of a sub-bitstream from the coded representation.

2. The method of solution 1, further comprising: extracting the sub-bitstream from the coded representation according to the format rule.

The following solutions show example embodiments of techniques discussed in the previous section (e.g., item 1)

3. The method of any of solutions 1-2, wherein, during extracting the sub-bitstream, a target id used for the extracting is allowed to be between range 0 to a value of a syntax field indicating in a video parameter set for the coded representation.

The following solutions show example embodiments of techniques discussed in the previous section (e.g., item 2)

4. The method of any of solutions 1-3, wherein the sub-bitstream is extracted without removing an access unit delimiter network abstraction layer (AUD NAL) from an output bitstream according to a layer id.

The following solutions show example embodiments of techniques discussed in the previous section (e.g., item 3)

5. The method of any of solutions 1-4, wherein the sub-bitstream is extracted by selectively removing network abstraction layer units that include a scalable nesting supplementary enhancement information message that are not applicable to output layers being extracted.

The following solutions show example embodiments of techniques discussed in the previous section (e.g., item 5)

6. The method of any of solutions 1-5, wherein the sub-bitstream is extracted by constraining the extracting to generate a non-scalable nested supplemental enhancement information (SEI) from a scalable nesting SEI message using a flag for output layer set being set and a flag for subpicture being disabled.

The following solutions show example embodiments of techniques discussed in the previous section (e.g., item 6)

7. The method of any of solutions 1-6, wherein the sub-bitstream is extracted according to a rule specifying extraction of multiple scalable-nested supplemental enhancement information (SEI) messages from a single SEI network abstraction layer unit.

The following solutions show example embodiments of techniques discussed in the previous section (e.g., item 7)

8. The method of any of solutions 1-7, wherein the sub-bitstream is extracted according to a rule that removes, from the coded representation, all supplemental enhancement information network abstraction layer SEI NAL units from which some SEI messages have been extracted and included as non-scalable-nested SEI messages.

The following solutions show example embodiments of techniques discussed in the previous section (e.g., item 8-13).

10. A video processing method comprising: performing a conversion between a video and a coded representation of the video, wherein the coded representation comprises one or more sub-bitstreams; wherein the conversion is performed according to a rule that specifies a relationship between a sub-bitstream extraction process and one or more syntax elements of the coded representation.

11. The method of solution 10, wherein the rule specifies to remove all supplemental enhancement information (SEI) network abstraction layer units (NAL) that contain an SEI message that apply to a picture or a subpicture for which the video coded layer is removed in case that one or more two conditions are true: (1) a type of the NAL unit is a specific type or (2) temporal identifier of the video coded layer meets a specific condition.

12. The method of any of solutions 10-11, wherein the rule specifies that, in case that layer identifiers in target output layer do not include all values of layer identifiers in the coded representation, the process additional removes all SEI NAL units that contain a non-scalable-nested SEI message with payloadType equal to 203.

13. The method of any of solutions 1-12, wherein the performing the conversion comprises encoding the video into the coded representation.

14. The method of any of solutions 1-12, wherein the performing the conversion comprises parsing and decoding the coded representation to generate the video.

15. A video decoding apparatus comprising a processor configured to implement a method recited in one or more of solutions 1 to 14.

16. A video encoding apparatus comprising a processor configured to implement a method recited in one or more of solutions 1 to 14.

17. A computer program product having computer code stored thereon, the code, when executed by a processor, causes the processor to implement a method recited in any of solutions 1 to 14.

18. A method, apparatus or system described in the present document.

A second set of solutions show example embodiments of techniques discussed in the previous section (e.g., items 10 and 11).

Figure 7A:
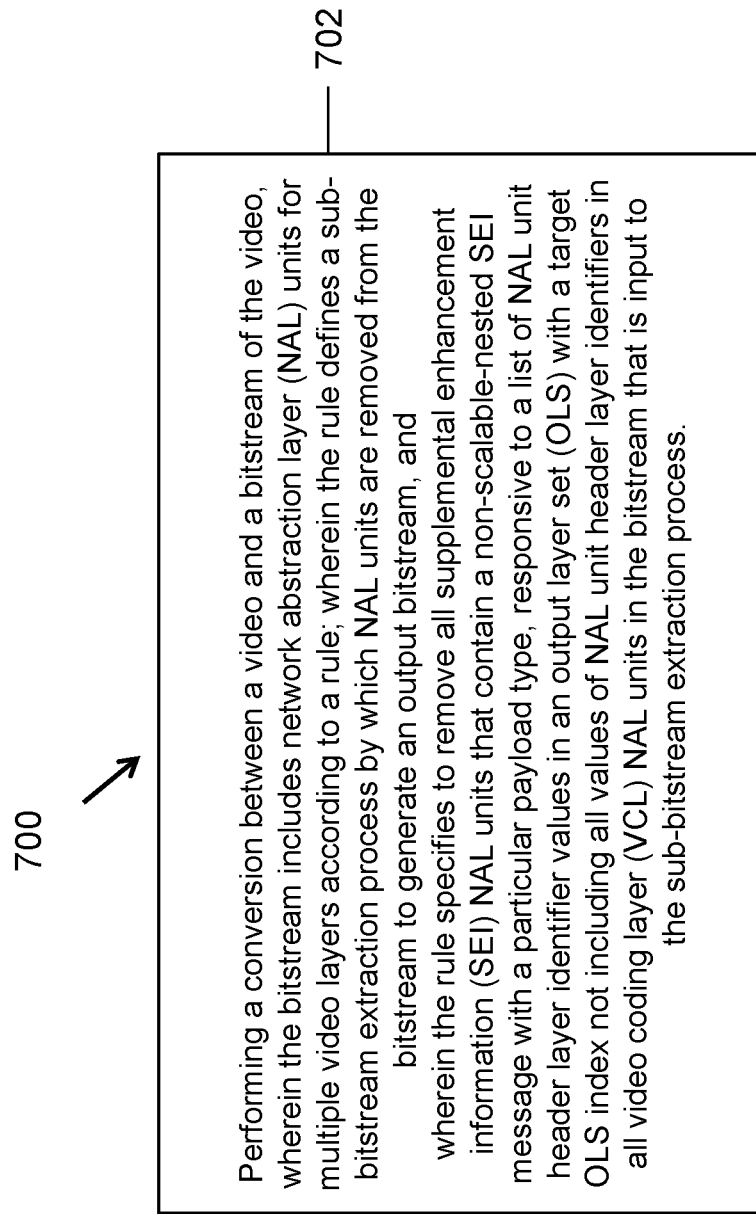

1. A method of processing video data (e.g., method 700 as shown in FIG. 7A), comprising: performing 702 a conversion between a video and a bitstream of the video, wherein the bitstream includes network abstraction layer (NAL) units for multiple video layers according to a rule; wherein the rule defines a sub-bitstream extraction process by which NAL units are removed from the bitstream to generate an output bitstream, and wherein the rule specifies to remove all supplemental enhancement information (SEI) NAL units that contain a non-scalable-nested SEI message with a particular payload type, responsive to a list of NAL unit header layer identifier values in an output layer set (OLS) with a target OLS index not including all values of NAL unit header layer identifiers in all video coding layer (VCL) NAL units in the bitstream that is input to the sub-bitstream extraction process.

2. The method of solution 1, wherein the non-scalable-nested SEI message with the particular payload type corresponds to a subpicture level information SEI message.

3. The method of solution 1, wherein the particular payload type is equal to 203.

4. The method of solution 1, wherein the non-scalable-nested SEI message with the particular payload type corresponds to a decoding unit information message.

5. The method of solution 1, wherein the particular payload type is equal to 130.

6. A method of processing video data (e.g., method 710 as shown in FIG. 7B), comprising: performing a conversion between a video and a bitstream of the video, wherein the bitstream is separable into one or more sub-bitstreams according to a rule that specifies a sub-bitstream extraction process to generate an output bitstream, and wherein the rule specifies whether or how to remove, based on a type of a video coding layer (VCL) network abstraction layer (NAL) unit and a temporal identifier of a video coding layer associated with the VCL NAL unit, all supplemental enhancement information (SEI) network abstraction layer (NAL) units that contain an SEI message that apply to a picture or a subpicture for which the VCL NAL unit is removed during the sub-bitstream extraction process.

7. The method of solution 6, wherein the rule specifies to remove all SEI NAL units responsive to (1) the type of the VCL NAL unit equal to TRAIL_NUT, STSA_NUT, RADL_NUT, or RASL_NUT, or GDR_NUT and (2) the temporal identifier of the video coding layer is greater than or equal to a number of sublayers in the video coding layer in an output layer set.

8. The method of solution 7, wherein, for the type of the VCL NAL unit equal to GDR_NUT, a syntax field indicative of a recovery point of decoded pictures in output order has a value greater than 0.

9. The method of solution 6, wherein the rule specifies to keep a SEI NAL unit in the output bitstream.

10. The method of any of solutions 1 to 9, wherein the conversion includes encoding the video into the bitstream.

11. The method of any of solutions 1 to 9, wherein the conversion includes decoding the video from the bitstream.

12. The method of any of solutions 1 to 9, wherein the conversion includes generating the bitstream from the video, and the method further comprises: storing the bitstream in a non-transitory computer-readable recording medium.

13. A video processing apparatus comprising a processor configured to implement a method recited in any one or more of solutions 1 to 12.

14. A method of storing a bitstream of a video, comprising, a method recited in any one of solutions 1 to 12, and further including storing the bitstream to a non-transitory computer-readable recording medium.

15. A computer readable medium storing program code that, when executed, causes a processor to implement a method recited in any one or more of solutions 1 to 12.

16. A computer readable medium that stores a coded representation or a bitstream generated according to any of the above described methods.

17. A video processing apparatus for storing a bitstream, wherein the video processing apparatus is configured to implement a method recited in any one or more of solutions 1 to 12.

A third set of solutions show example embodiments of techniques discussed in the previous section (e.g., items 12 and 13).

Figure 8:
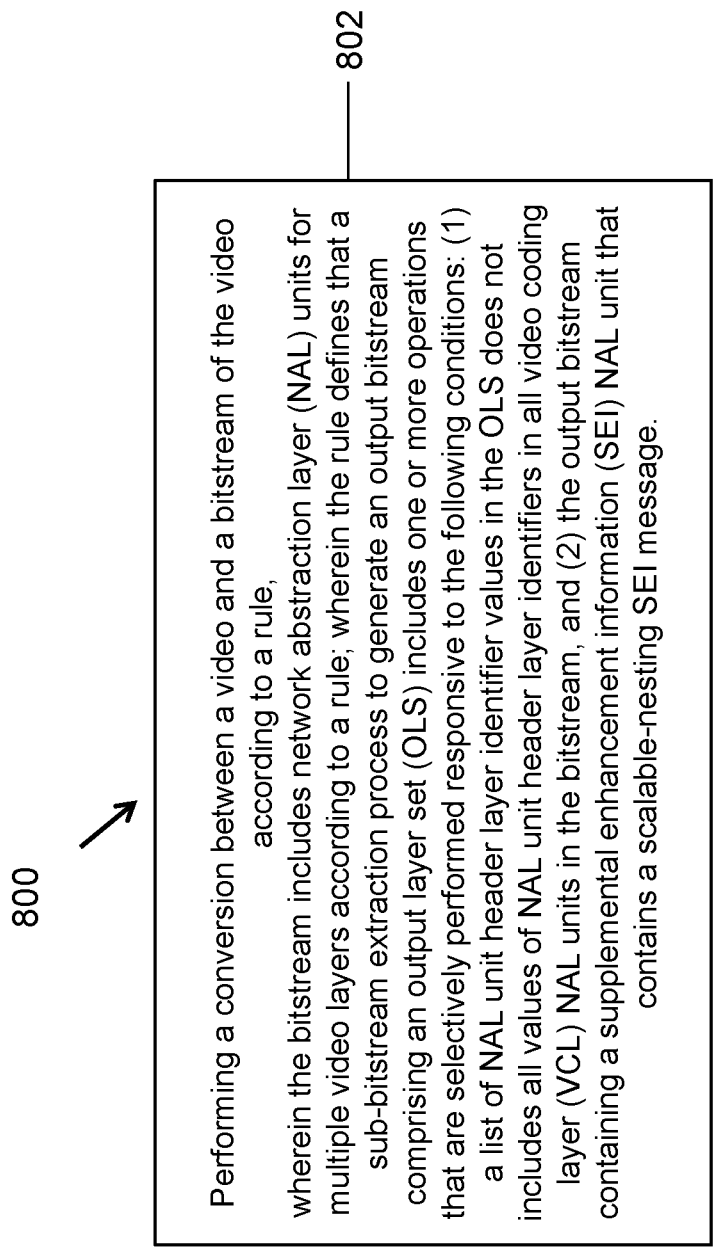
FIG. 8 is a flowchart for an example method of video processing based on some implementations of the disclosed technology.

1. A method of processing video data (e.g., method 800 as shown in FIG. 8), comprising: performing 802 a conversion between a video and a bitstream of the video according to a rule, wherein the bitstream includes network abstraction layer (NAL) units for multiple video layers according to a rule; wherein the rule defines that a sub-bitstream extraction process to generate an output bitstream comprising an output layer set (OLS) includes one or more operations that are selectively performed responsive to the following conditions: (1) a list of NAL unit header layer identifier values in the OLS does not includes all values of NAL unit header layer identifiers in all video coding layer (VCL) NAL units in the bitstream, and (2) the output bitstream containing a supplemental enhancement information (SEI) NAL unit that contains a scalable-nesting SEI message.

2. The method of solution 1, wherein the scalable-nesting SEI message is associated with a first flag equal to a particular value that applies to specific OLSs or specific layers that have a same set of layers as in the output bitstream.

3. The method of solution 2, wherein the first flag equal to 0 specifies that scalable-nested SEI messages that apply to the specific OLSs or the specific layers apply to all subpictures of the specified OLSs or the specific layers.

4. The method of solution 1, wherein the scalable-nesting SEI message is associated with a second flag indicative of whether the scalable-nesting SEI message applies to specific OLSs or specific layers.

5. The method of any of solutions 1-4, wherein the one or more operations include generating an additional SEI NAL unit.

6. The method of solution 5, wherein the one or more operations include including the additional SEI NAL unit in a picture unit containing the SEI NAL unit.

7. The method of solution 6, wherein the additional SEI NAL unit is immediately after the SEI NAL unit.

8. The method of any of solution 6, wherein the one or more operations further include extracting scalable-nested SEI messages from the scalable-nesting SEI message and including the scalable-nested SEI messages in the additional SEI NAL unit.

9. The method of solution 1, wherein the one or more operations include removing the SEI NAL unit from the output bitstream.

10. The method of solution 1, wherein the one or more operations include keeping the SEI NAL unit in the output bitstream.

11. The method of any of solutions 1 to 10, wherein the conversion includes encoding the video into the bitstream.

12. The method of any of solutions 1 to 10, wherein the conversion includes decoding the video from the bitstream.

13. The method of any of solutions 1 to 10, wherein the conversion includes generating the bitstream from the video, and the method further comprises: storing the bitstream in a non-transitory computer-readable recording medium.

14. A video processing apparatus comprising a processor configured to implement a method recited in any one or more of solutions 1 to 13.

15. A method of storing a bitstream of a video, comprising, a method recited in any one of solutions 1 to 13, and further including storing the bitstream to a non-transitory computer-readable recording medium.

16. A computer readable medium storing program code that, when executed, causes a processor to implement a method recited in any one or more of solutions 1 to 13.

17. A computer readable medium that stores a bitstream generated according to any of the above described methods.

18. A video processing apparatus for storing a bitstream, wherein the video processing apparatus is configured to implement a method recited in any one or more of solutions 1 to 13.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a video including one or more layers and a bitstream of the video according to a rule,
wherein the rule specifies a sub-bitstream extraction process by which network abstraction layer (NAL) units are removed from an input bitstream to the sub-bitstream extraction process to generate an output sub-bitstream,
wherein the rule further specifies that when a list of NAL unit header layer identifier values in an output layer set (OLS) with a target OLS index does not include all values of NAL unit header layer identifiers in all video coding layer (VCL) NAL units in the input bitstream, all supplemental enhancement information (SEI) NAL units that contain a non-scalable-nested SEI message with particular payload types are removed, and
wherein the non-scalable-nested SEI message with the particular payload types comprises a non-scalable-nested SEI message with a first particular payload type corresponding to a subpicture level information SEI message.

2. The method of claim 1, wherein the first particular payload type is equal to 203.

3. The method of claim 1, wherein the non-scalable-nested SEI message with the particular payload types further comprises a non-scalable-nested SEI message with a second particular payload type corresponding to a decoding unit information message.

4. The method of claim 3, wherein the second particular payload type is equal to 130.

5. The method of claim 1, wherein the rule further specifies that NAL units satisfying a first set of conditions are removed, wherein the first set of conditions comprises that: 1) NAL units have nuh_layer_id not included in the list of NAL unit header layer identifier values in the OLS with the target OLS index, 2) NAL units are not decoding capability information (DCI) NAL units, video parameter set (VPS) NAL units, access unit delimiter (AUD) NAL units, or end of bitstream (EOB) NAL units, and 3) NAL units are not NAL units containing a particular non-scalable-nested SEI message.

6. The method of claim 1, wherein the rule further specifies that all VCL NAL units satisfying a second set of conditions are removed, wherein the second set of conditions comprises that nal_unit_type is equal to TRAIL_NUT, STSA_NUT, RADL_NUT, or RASL_NUT, or nal_unit_type is equal to GDR_NUT and associated ph_recovery_poc_cnt is greater than 0.

7. The method of claim 1, wherein the conversion includes encoding the video into the bitstream.

8. The method of claim 1, wherein the conversion includes decoding the video from the bitstream.

9. An apparatus for processing video data comprising a processor and a non-transitory memory with instructions thereon, wherein the instructions upon execution by the processor, cause the processor to:
perform a conversion between a video including one or more layers and a bitstream of the video according to a rule,
wherein the rule specifies a sub-bitstream extraction process by which network abstraction layer (NAL) units are removed from an input bitstream to the sub-bitstream extraction process to generate an output sub-bitstream,
wherein the rule further specifies that when a list of NAL unit header layer identifier values in an output layer set (OLS) with a target OLS index does not include all values of NAL unit header layer identifiers in all video coding layer (VCL) NAL units in the input bitstream, all supplemental enhancement information (SEI) NAL units that contain a non-scalable-nested SEI message with particular payload types are removed, and
wherein the non-scalable-nested SEI message with the particular payload types comprises a non-scalable-nested SEI message with a first particular payload type corresponding to a subpicture level information SEI message.

10. The apparatus of claim 9, wherein the first particular payload type is equal to 203, wherein the non-scalable-nested SEI message with the particular payload types further comprises a non-scalable-nested SEI message with a second particular payload type corresponding to a decoding unit information message, and wherein the second particular payload type is equal to 130.

11. The apparatus of claim 9, wherein the rule further specifies that NAL units satisfying a first set of conditions are removed, wherein the first set of conditions comprises that: 1) NAL units have nuh_layer_id not included in the list LayerIdInOls[targetOlsIdx], 2) NAL units are not decoding capability information (DCI) NAL units, video parameter set (VPS) NAL units, access unit delimiter (AUD) NAL units, or end of bitstream (EOB) NAL units, and 3) NAL units are not NAL units containing a particular non-scalable-nested SEI message.

12. The apparatus of claim 9, wherein the rule further specifies that all VCL NAL units satisfying a second set of conditions are removed, wherein the second set of conditions comprises that nal_unit_type is equal to TRAIL_NUT, STSA_NUT, RADL_NUT, or RASL_NUT, or nal_unit_type is equal to GDR_NUT and associated ph_recovery_poc_cnt is greater than 0.

13. A non-transitory computer-readable storage medium storing instructions that cause a processor to:
perform a conversion between a video including one or more layers and a bitstream of the video according to a rule,
wherein the rule specifies a sub-bitstream extraction process by which network abstraction layer (NAL) units are removed from an input bitstream to the sub-bitstream extraction process to generate an output sub-bitstream,
wherein the rule further specifies that when a list of NAL unit header layer identifier values in an output layer set (OLS) with a target OLS index does not include all values of NAL unit header layer identifiers in all video coding layer (VCL) NAL units in the input bitstream, all supplemental enhancement information (SEI) NAL units that contain a non-scalable-nested SEI message with particular payload types are removed, and
wherein the non-scalable-nested SEI message with the particular payload types comprises a non-scalable-nested SEI message with a first particular payload type corresponding to a subpicture level information SEI message.

14. The non-transitory computer-readable storage medium of claim 13, wherein the first particular payload type is equal to 203, wherein the non-scalable-nested SEI message with the particular payload types further comprises a non-scalable-nested SEI message with a second particular payload type corresponding to a decoding unit information message, and wherein the second particular payload type is equal to 130.

15. The non-transitory computer-readable storage medium of claim 13, wherein the rule further specifies that NAL units satisfying a first set of conditions are removed, wherein the first set of conditions comprises that: 1) NAL units have nuh_layer_id not included in the list LayerIdInOls[targetOlsIdx], 2) NAL units are not decoding capability information (DCI) NAL units, video parameter set (VPS) NAL units, access unit delimiter (AUD) NAL units, or end of bitstream (EOB) NAL units, and 3) NAL units are not NAL units containing a particular non-scalable-nested SEI message.

16. The non-transitory computer-readable storage medium of claim 13, wherein the rule further specifies that all VCL NAL units satisfying a second set of conditions are removed, wherein the second set of conditions comprises that nal_unit_type is equal to TRAIL_NUT, STSA_NUT, RADL_NUT, or RASL_NUT, or nal_unit_type is equal to GDR_NUT and associated ph_recovery_poc_cnt is greater than 0.

17. A non-transitory computer-readable recording medium storing a bitstream of a video which is generated by a method performed by a video processing apparatus, wherein the method comprises:
generating the bitstream of the video including one or more layers according to a rule,
wherein the rule specifies a sub-bitstream extraction process by which network abstraction layer (NAL) units are removed from an input bitstream to the sub-bitstream extraction process to generate an output sub-bitstream,
wherein the rule further specifies that when a list of NAL unit header layer identifier values in an output layer set (OLS) with a target OLS index does not include all values of NAL unit header layer identifiers in all video coding layer (VCL) NAL units in the input bitstream, all supplemental enhancement information (SEI) NAL units that contain a non-scalable-nested SEI message with particular payload types are removed, and
wherein the non-scalable-nested SEI message with the particular payload types comprises a non-scalable-nested SEI message with a first particular payload type corresponding to a subpicture level information SEI message.

18. The non-transitory computer-readable recording medium of claim 17, wherein the first particular payload type is equal to 203, wherein the non-scalable-nested SEI message with the particular payload types further comprises a non-scalable-nested SEI message with a second particular payload type corresponding to a decoding unit information message, and wherein the second particular payload type is equal to 130.

19. The non-transitory computer-readable recording medium of claim 17, wherein the rule further specifies that NAL units satisfying a first set of conditions are removed, wherein the first set of conditions comprises that: 1) NAL units have nuh_layer_id not included in the list LayerIdInOls[targetOlsIdx], 2) NAL units are not decoding capability information (DCI) NAL units, video parameter set (VPS) NAL units, access unit delimiter (AUD) NAL units, or end of bitstream (EOB) NAL units, and 3) NAL units are not NAL units containing a particular non-scalable-nested SEI message.

20. The non-transitory computer-readable recording medium of claim 17, wherein the rule further specifies that all VCL NAL units satisfying a second set of conditions are removed, wherein the second set of conditions comprises that nal_unit_type is equal to TRAIL_NUT, STSA_NUT, RADL_NUT, or RASL_NUT, or nal_unit_type is equal to GDR_NUT and associated ph_recovery_poc_cnt is greater than 0.

* * * * *